US012724520B2

(12) United States Patent
Tseng et al.

(10) Patent No.: US 12,724,520 B2
(45) Date of Patent: Sep. 1, 2026

(54) TOUCH SENSING STRUCTURE

(71) Applicant: E Ink Holdings Inc., Hsinchu (TW)

(72) Inventors: Hung Wei Tseng, Hsinchu (TW); Chen Cheng Lin, Hsinchu (TW); Yi Chun Kuo, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 19/190,811

(22) Filed: Apr. 28, 2025

(65) Prior Publication Data

US 2026/0003469 A1 Jan. 1, 2026

Related U.S. Application Data

(60) Provisional application No. 63/665,270, filed on Jun. 28, 2024.

(51) Int. Cl.
*G06F 3/046* (2006.01)
*G06F 3/041* (2006.01)

(52) U.S. Cl.
CPC ............ *G06F 3/046* (2013.01); *G06F 3/0416* (2013.01); *G06F 2203/04106* (2013.01)

(58) Field of Classification Search
CPC .................. G06F 3/046; G06F 3/0416; G06F 2203/04106
See application file for complete search history.

(56) References Cited

U.S. PATENT DOCUMENTS 11,809,672 B2 11/2023 Rosenberg et al.
11,816,278 B1 11/2023 Chen et al.
12,019,829 B2 6/2024 Kim et al.
2017/0228052 A1 8/2017 Nakamura
2017/0269732 A1 9/2017 Chang et al.
2018/0032173 A1 2/2018 Kim et al.
2020/0159362 A1* 5/2020 Kim ...................... G06F 3/0446
2024/0086019 A1* 3/2024 Zhu ...................... G06F 3/0448
2024/0419284 A1* 12/2024 Ma ...................... G06F 3/0443

FOREIGN PATENT DOCUMENTS

CN 116841419 A 10/2023
TW 201502932 A 1/2015

OTHER PUBLICATIONS

The office action of corresponding TW application No. 114115968 issued on Mar. 2, 2026.

* cited by examiner

*Primary Examiner* — Hang Lin
(74) *Attorney, Agent, or Firm* — CKC & Partners Co., LLC

(57) ABSTRACT

A touch sensing structure includes a display panel, a first sensing unit, a second sensing unit, and a third sensing unit. The first sensing unit is disposed on a first side or a second side of the display panel. The second sensing unit and the third sensing unit are disposed on the second side of the display panel. The first sensing unit and the second sensing unit belong to the same layer when the first sensing unit is disposed on the second side of the display panel. Each of the first sensing unit and second sensing unit is composed of plural metal grid units. Each of the metal grid units is shaped as a rhombus and an acute angle of the rhombus is less than 90 degrees.

19 Claims, 15 Drawing Sheets

TOUCH SENSING STRUCTURE

CROSS-REFERENCE TO RELATED APPLICATION

This application claims priority to U.S. Provisional Application Ser. No. 63/665,270, filed Jun. 28, 2024, which is herein incorporated by reference in its entirety.

BACKGROUND

Field of Invention

The present disclosure relates to a touch sensing structure. More particularly, the present disclosure relates to the touch sensing structure that integrates a passive electromagnetic stylus sensing function and a finger touch sensing function.

Description of Related Art

In general, four metal layers are required to integrate the passive electromagnetic stylus sensing function and the finger touch sensing function on the display panel. Two of the four metal layers are located at the top of the display panel and are used to implement the finger touch sensing function, and the remaining two of the four metal layers are located at the bottom of the display panel and are used to implement the passive electromagnetic stylus sensing function. However, too many metal layers are disadvantageous to the requirements of shrinking and thinning the display device.

SUMMARY

The present disclosure provides a touch sensing structure that integrates a passive electromagnetic stylus sensing function and a finger touch sensing function on a display panel by using only three layers of sensing units.

Some embodiments of the present disclosure provide a touch sensing structure. The touch sensing structure includes a display panel, a first sensing unit, a second sensing unit, and a third sensing unit. The first sensing unit is disposed on a first side or a second side of the display panel. The second sensing unit and the third sensing unit are disposed on the second side of the display panel. In response to the first sensing unit being disposed on the second side of the display panel, the first sensing unit and the second sensing unit belong to a same layer. Each of the first sensing unit and second sensing unit is composed of plural first metal grid units. Each of the first metal grid units is shaped as a rhombus and an acute angle of the rhombus is less than 90 degrees.

In accordance with one or more embodiments of the present disclosure, the acute angle of the rhombus is oriented toward or away from a propagation direction of light emitted by the display panel.

In accordance with one or more embodiments of the present disclosure, an orthographic projection of the first sensing unit on the display panel is not overlapped with an orthographic projection of the second sensing unit on the display panel.

In accordance with one or more embodiments of the present disclosure, the first sensing unit is a comb-shaped electrode, the second sensing unit is composed of plural first strip-shaped electrodes, and one of the first strip-shaped electrodes is disposed between adjacent two of plural teeth of the comb-shaped electrode.

In accordance with one or more embodiments of the present disclosure, in a stylus driving mode, a portion of the teeth of the comb-shaped electrode is driven by an AC signal, and a remaining portion of the teeth of the comb-shaped electrode receives a DC common voltage.

In accordance with one or more embodiments of the present disclosure, in a stylus driving mode, a first subset of the teeth of the comb-shaped electrode is driven by a first AC signal, and a second subset of the teeth of the comb-shaped electrode is driven by a second AC signal. A phase of the first AC signal is opposite to a phase of the second AC signal.

In accordance with one or more embodiments of the present disclosure, in the stylus driving mode, a third subset of the teeth of the comb-shaped electrode and a connecting portion of the comb-shaped electrode receive a DC common voltage. The connecting portion of the comb-shaped electrode connects the teeth of the comb-shaped electrode.

In accordance with one or more embodiments of the present disclosure, in the stylus driving mode, a third subset of the teeth of the comb-shaped electrode is floating or in a high impedance state. The connecting portion of the comb-shaped electrode connects the teeth of the comb-shaped electrode.

In accordance with one or more embodiments of the present disclosure, in the stylus driving mode, the first strip-shaped electrodes are sequentially driven by a third AC signal in a time-division manner, and a frequency of the third AC signal is different from a frequency of the first AC signal, and the frequency of the third AC signal is different from a frequency of the second AC signal.

In accordance with one or more embodiments of the present disclosure, the teeth of the comb-shaped electrode and the first strip-shaped electrodes are driven by a same AC signal.

In accordance with one or more embodiments of the present disclosure, the third sensing unit is composed of plural second strip-shaped electrodes, and an orthographic projection of the first strip-shaped electrodes on the display panel is perpendicular to an orthographic projection of the second strip-shaped electrodes on the display panel.

In accordance with one or more embodiments of the present disclosure, in a stylus sensing mode, one of the second strip-shaped electrodes and an adjacent one of the second strip-shaped electrodes which is adjacent to the one of the second strip-shaped electrodes form a closed conductive loop.

In accordance with one or more embodiments of the present disclosure, in an i-th subframe of the stylus sensing mode, the one of the second strip-shaped electrodes and a preceding one of the second strip-shaped electrodes which is preceding and adjacent to the one of the second strip-shaped electrodes form a closed conductive loop. In an (i+1)-th subframe of the stylus sensing mode, the one of the second strip-shaped electrodes and a subsequent one of the second strip-shaped electrodes which is subsequent to and adjacent to the one of the second strip-shaped electrodes form a closed conductive loop.

In accordance with one or more embodiments of the present disclosure, in the touch mode, two ends of each of the second strip-shaped electrodes are short-circuited to each other.

In accordance with one or more embodiments of the present disclosure, the third sensing unit is composed of plural second metal grid units, and each of the second metal grid units is shaped as a rhombus.

In accordance with one or more embodiments of the present disclosure, an orthographic projection of the metal grid units on the display panel is perpendicular to an orthographic projection of the second metal grid units on the display panel.

In accordance with one or more embodiments of the present disclosure, the teeth include a first tooth, a second tooth, a third tooth, and a fourth tooth adjacent to each other. The first tooth and the second tooth are adjacent to each other and driven by the first AC signal. The third tooth and the fourth tooth are adjacent to each other and driven by the second AC signal.

In accordance with one or more embodiments of the present disclosure, the teeth further include a fifth tooth, a sixth tooth, a seventh tooth, and an eighth tooth adjacent to each other. The fifth tooth and the sixth tooth are adjacent to each other and driven by the second AC signal. The seventh tooth and the eighth tooth are adjacent to each other and driven by the first AC signal. The first tooth, the second tooth, the third tooth, and the fourth tooth are driven to form a current loop of which current flows in a clockwise direction. The fifth tooth, the sixth tooth, the seventh tooth, and the eighth tooth are driven to form a current loop of which current flows in a counterclockwise direction.

In accordance with one or more embodiments of the present disclosure, touch sensing structure further includes a transparent substrate located between the second sensing unit and the third sensing unit.

In accordance with one or more embodiments of the present disclosure, the first sensing unit is used as a signal transmitting terminal in the stylus driving mode, and the third sensing unit is used as a signal receiving terminal in a stylus receiving mode.

In accordance with one or more embodiments of the present disclosure, one of the second sensing unit and the third sensing unit is used as a signal transmitting terminal in the touch mode, and the other of the second sensing unit and the third sensing unit is used as a signal receiving terminal in the touch mode.

In order to make the above features and advantages of the present disclosure more apparent and understandable, the following embodiments of the present disclosure, together with the accompanying drawings, are described in detail below.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Specific embodiments of the present disclosure are further described in detail below with reference to the accompanying drawings. However, the embodiments described are not intended to limit the present disclosure and it is not intended for the description of operations to limit the order of implementation.

Figure 1:
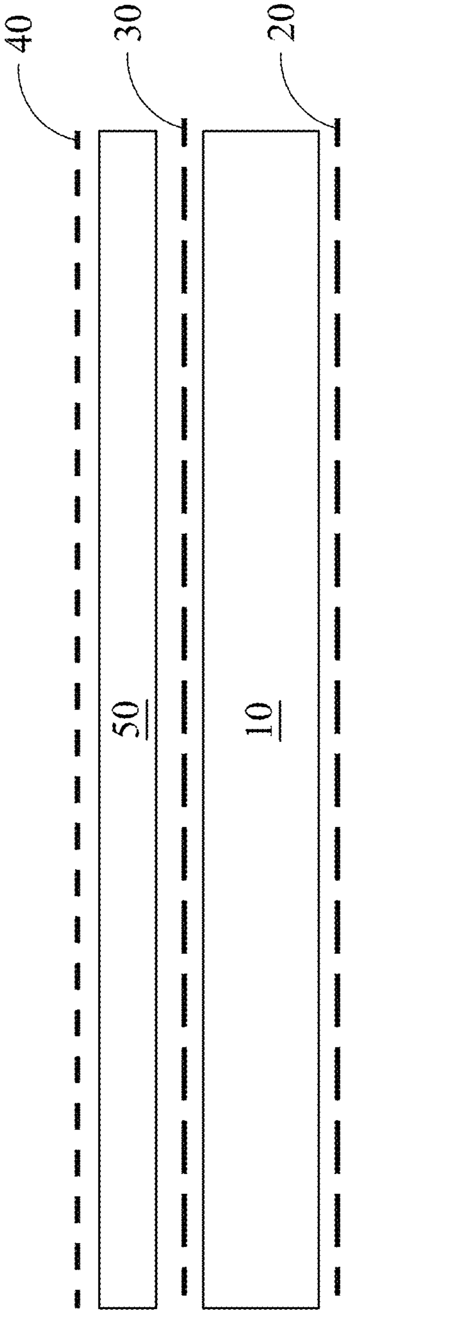
FIG. 1 is a schematic diagram of a touch sensing structure according to a first embodiment of the present disclosure.

FIG. 1 is a schematic diagram of a touch sensing structure 100 according to a first embodiment of the present disclosure. The touch sensing structure 100 includes a display panel 10, a first sensing unit 20, a second sensing unit 30, and a third sensing unit 40. The first sensing unit 20 is disposed on a first side of the display panel 10 (i.e., a lower side of the display panel 10 as shown in FIG. 1). The second sensing unit 30 and the third sensing unit 40 are disposed on a second side of the display panel 10 (i.e., the upper side of the display panel 10 as shown in FIG. 1), and the second sensing unit 30 is located between the display panel 10 and the third sensing unit 40. As shown in FIG. 1, the touch sensing structure 100 further includes a transparent substrate 50 for supporting the third sensing unit 40. The transparent substrate 50 is located between the second sensing unit 30 and the third sensing unit 40.

Figure 2:
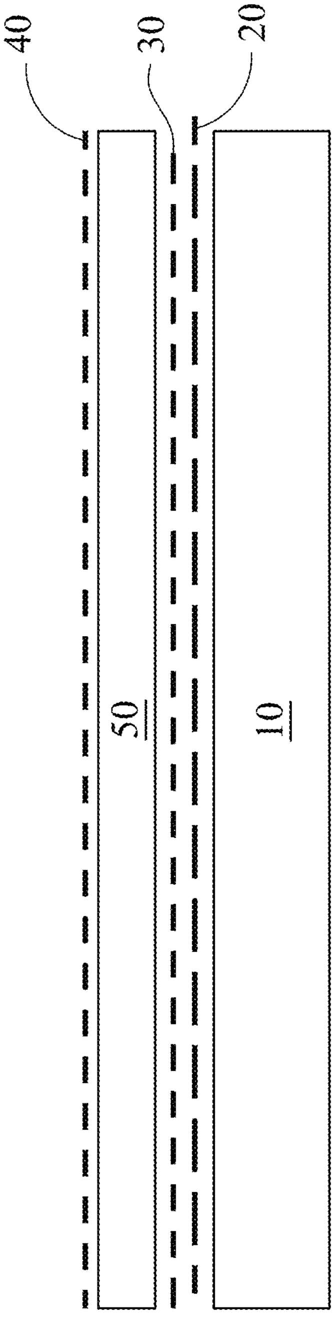
FIG. 2 is a schematic diagram of a touch sensing structure according to a second embodiment of the present disclosure.

FIG. 2 is a schematic diagram of a touch sensing structure 200 according to a second embodiment of the present disclosure. The touch sensing structure 200 includes a display panel 10, a first sensing unit 20, a second sensing unit 30, and a third sensing unit 40. The first sensing unit 20, the second sensing unit 30, and the third sensing unit 40 are disposed on a second side of the display panel 10 (i.e., the upper side of the display panel 10 as shown in FIG. 2). The second sensing unit 30 is located between the display panel 10 and the third sensing unit 40. As shown in FIG. 2, the touch sensing structure 200 further includes a transparent substrate 50 for supporting the third sensing unit 40. The transparent substrate 50 is located between the second sensing unit 30 and the third sensing unit 40. The first sensing unit 20 and the second sensing unit 30 are located between the display panel 10 and the transparent substrate 50. Specifically, the first sensing unit 20 and the second sensing unit 30 belong to the same layer.

Figure 3:
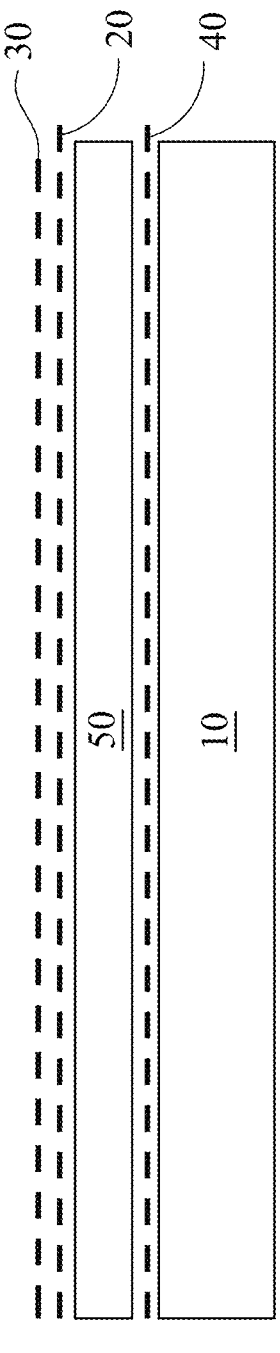
FIG. 3 is a schematic diagram of a touch sensing structure according to a third embodiment of the present disclosure.

FIG. 3 is a schematic diagram of a touch sensing structure 300 according to a third embodiment of the present disclosure. The touch sensing structure 300 includes a display panel 10, a first sensing unit 20, a second sensing unit 30, and a third sensing unit 40. The first sensing unit 20, the second sensing unit 30, and the third sensing unit 40 are disposed on a second side of the display panel 10 (i.e., the upper side of the display panel 10 as shown in FIG. 3). The third sensing unit 40 is located between the display panel 10 and the second sensing unit 30. As shown in FIG. 3, the touch sensing structure 300 further includes a transparent substrate 50 for supporting the first sensing unit 20 and the second sensing unit 30. The transparent substrate 50 is located between the second sensing unit 30 and the third sensing unit 40. The transparent substrate 50 is located between the first sensing unit 20 and the third sensing unit 40. Specifically, the first sensing unit 20 and the second sensing unit 30 belong to the same layer.

Figure 4:
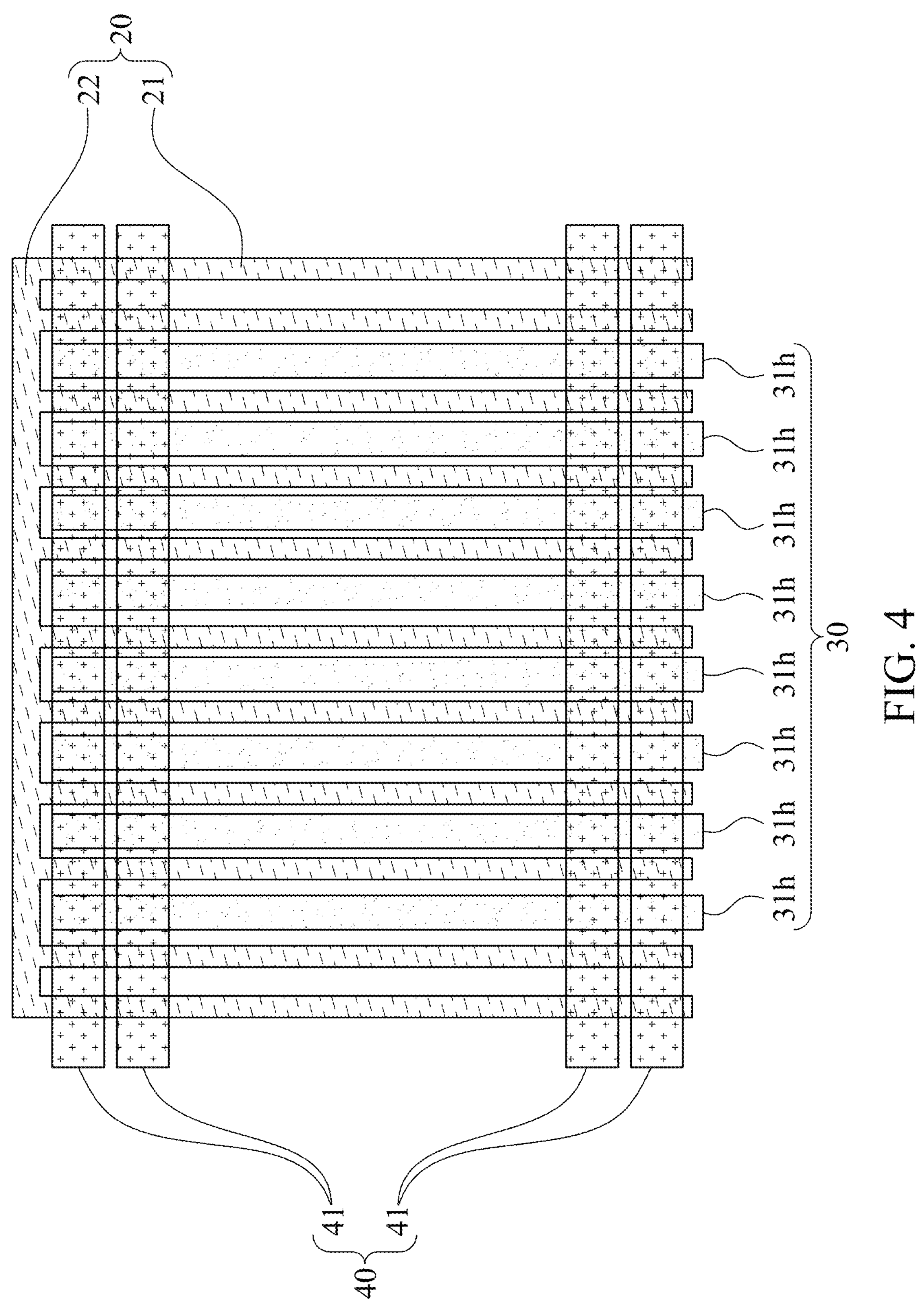
FIG. 4 is a schematic diagram of orthographic projections of the first sensing unit, the second sensing unit, and the third sensing unit on the display panel according to some embodiments of the present disclosure.

FIG. 4 is a schematic diagram of orthographic projections of the first sensing unit 20, the second sensing unit 30, and the third sensing unit 40 on the display panel 10 according to some embodiments of the present disclosure. As shown in FIG. 4, the orthographic projection of the first sensing unit 20 on the display panel 10 is not overlapped with the orthographic projection of the second sensing unit 30 on the display panel 10. As shown in FIG. 4, the first sensing unit 20 is a comb-shaped electrode. The comb-shaped electrode includes plural teeth 21 and a connecting portion 22 connecting the teeth 21. The teeth 21 are perpendicular to the connecting portion 22.

As shown in FIG. 4, the second sensing unit 30 is composed of plural first strip-shaped electrodes 31*a*, 31*b*, 31*c*, 31*d*, 31*e*, 31*f*, 31*g*, and 31*h*. The orthographic projections of the first strip-shaped electrodes 31*a*~31*h* on the display panel 10 are parallel to the orthographic projections of the teeth 21 on the display panel 10. One of the first strip-shaped electrodes 31*a*~31*h* is located between adjacent two of the teeth 21 of the comb-shaped electrode. As shown in FIG. 4, the third sensing unit 40 is composed of plurality second strip-shaped electrodes 41. The orthographic projections of the first strip-shaped electrodes 31*a*~31*h* on the display panel 10 are perpendicular to the orthographic projections of the second strip-shaped electrodes 41 on the display panel 10. The orthographic projections of the teeth 21 on the display panel 10 are perpendicular to the orthographic projections of the second strip-shaped electrodes 41 on the display panel 10. The orthographic projection of the connecting portion 22 on the display panel 10 is parallel to the orthographic projections of the second strip-shaped electrodes 41 on the display panel 10.

Figure 5:
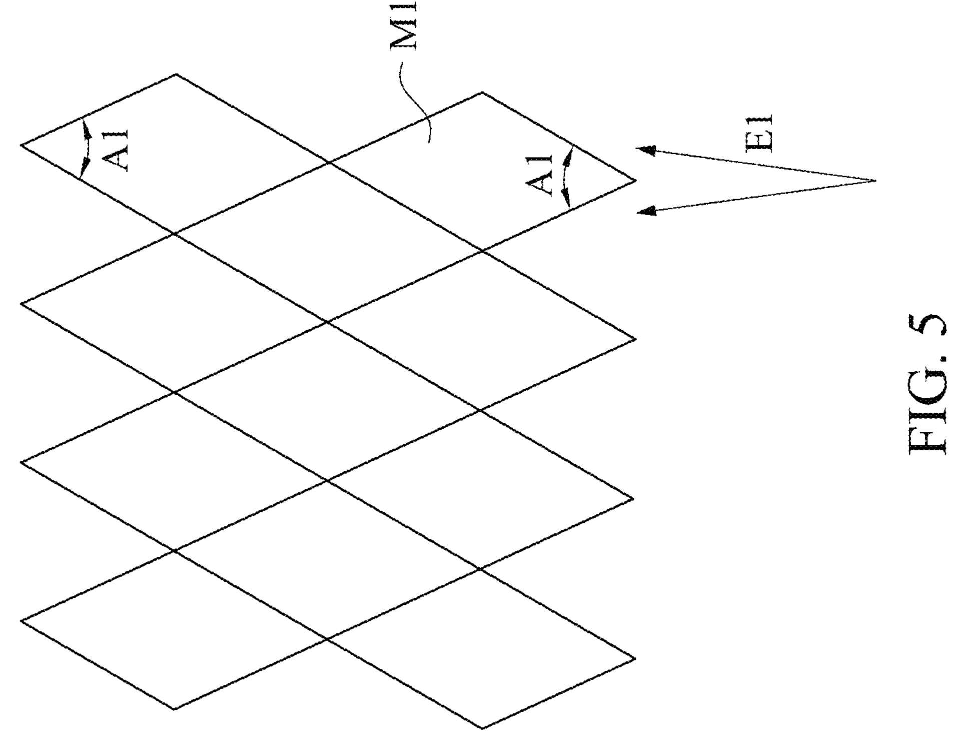
FIG. 5 is a schematic structural diagram of the first sensing unit and the second sensing unit according to some embodiments of the present disclosure.

FIG. 5 is a schematic structural diagram of the first sensing unit 20 and the second sensing unit 30 according to some embodiments of the present disclosure. As shown in FIG. 5, the first sensing unit 20 and the second sensing unit 30 are respectively composed of plural first metal grid units M1. Each of the first metal grid units M1 is shaped as a rhombus and an acute angle A1 of the rhombus is less than 90 degrees. It is worth mentioning that, in a preferred embodiment of the present disclosure, the acute angle A1 of the rhombus is less than 60 degrees. As shown in FIG. 5, the acute angle A1 of the rhombus of each of the first metal grid units M1 is oriented toward (e.g., the lower acute angle A1 as shown in FIG. 5) or away from (e.g., the upper acute angle A1 as shown in FIG. 5) the propagation direction of the light E1 emitted by the display panel 10. Specifically, the aforementioned design of the acute angle A1 can make the touch sensing structure 100 or the touch sensing structure 200 have relatively good optical characteristics.

Figure 6:
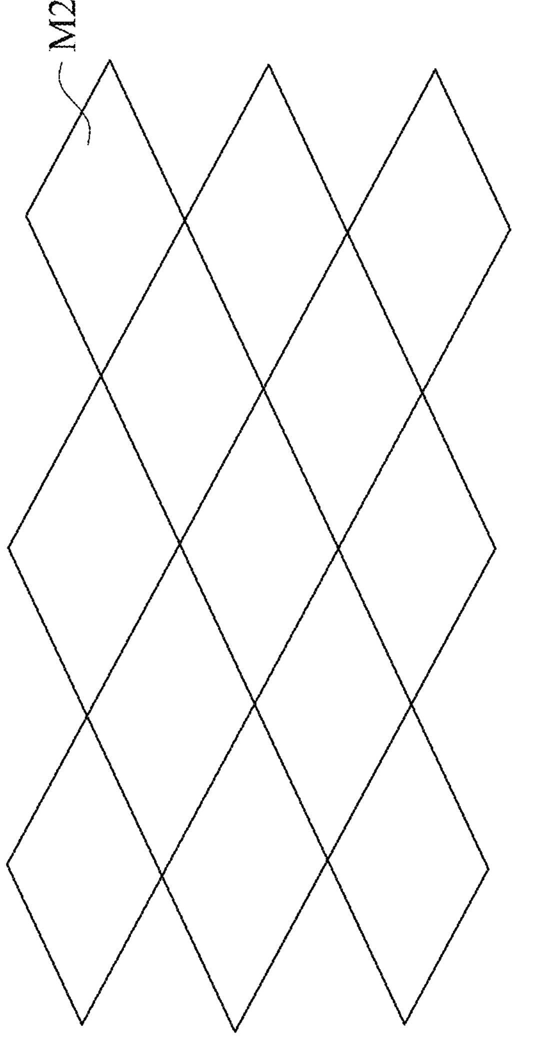
FIG. 6 is a schematic structural diagram of the third sensing unit according to some embodiments of the present disclosure.

FIG. 6 is a schematic structural diagram of the third sensing unit 40 according to some embodiments of the present disclosure. As shown in FIG. 6, the third sensing unit 40 is composed of plural second metal grid units M2, and each of the second metal grid units M2 is shaped as a rhombus. Different from the acute angle A1 of the rhombus of each of the first metal grid units M1 being less than 90 degrees, the present disclosure does not limit the angle value of the acute angle of the rhombus of each of the second metal grid units M2. However, in a preferred embodiment of the present disclosure, the orthographic projections of the first metal grid units M1 on the display panel 10 are perpendicular to the orthographic projections of the second metal grid units M2 on the display panel 10.

Specifically, in order to improve the aperture ratio of the touch sensing structure 100 or the touch sensing structure 200, the first sensing unit 20 and the second sensing unit 30 are designed to be composed of the first metal grid units M1, and the third sensing unit 40 is designed to be composed of the second metal grid units M2.

In some embodiments of the present disclosure, the first sensing unit 20 is used as a signal transmitting terminal of the touch sensing structure 100 or the touch sensing structure 200 in a stylus driving mode, and the third sensing unit 40 is used as a signal receiving terminal of the touch sensing structure 100 or the touch sensing structure 200 in a stylus receiving mode. In some embodiments of the present disclosure, in a touch mode, one of the second sensing unit 30 and the third sensing unit 40 is used as a signal transmitting terminal of the touch sensing structure 100 or the touch sensing structure 200, and the other of the second sensing unit 30 and the third sensing unit 40 is used as a signal receiving terminal of the touch sensing structure 100 or the touch sensing structure 200. In some embodiments of the present disclosure, the stylus is a passive stylus pen, and is an electro-magnetic resonance (EMR) type stylus pen. According to the prior art, four metal layers are required to integrate the passive electromagnetic stylus sensing function and the finger touch sensing function on the display panel. In contrast, the touch sensing structure 100 or the touch sensing structure 200 of the present disclosure only needs to arrange three metal layers (i.e., the first sensing unit 20, the second sensing unit 30, and the third sensing unit 40) to integrate the passive electromagnetic stylus sensing function and the finger touch sensing function on the display panel 10, and the first sensing unit 20 and the second sensing unit 30 may belong to the same metal layer, which is advantageous in achieving lightweight products and reducing process complexity.

Figure 7:
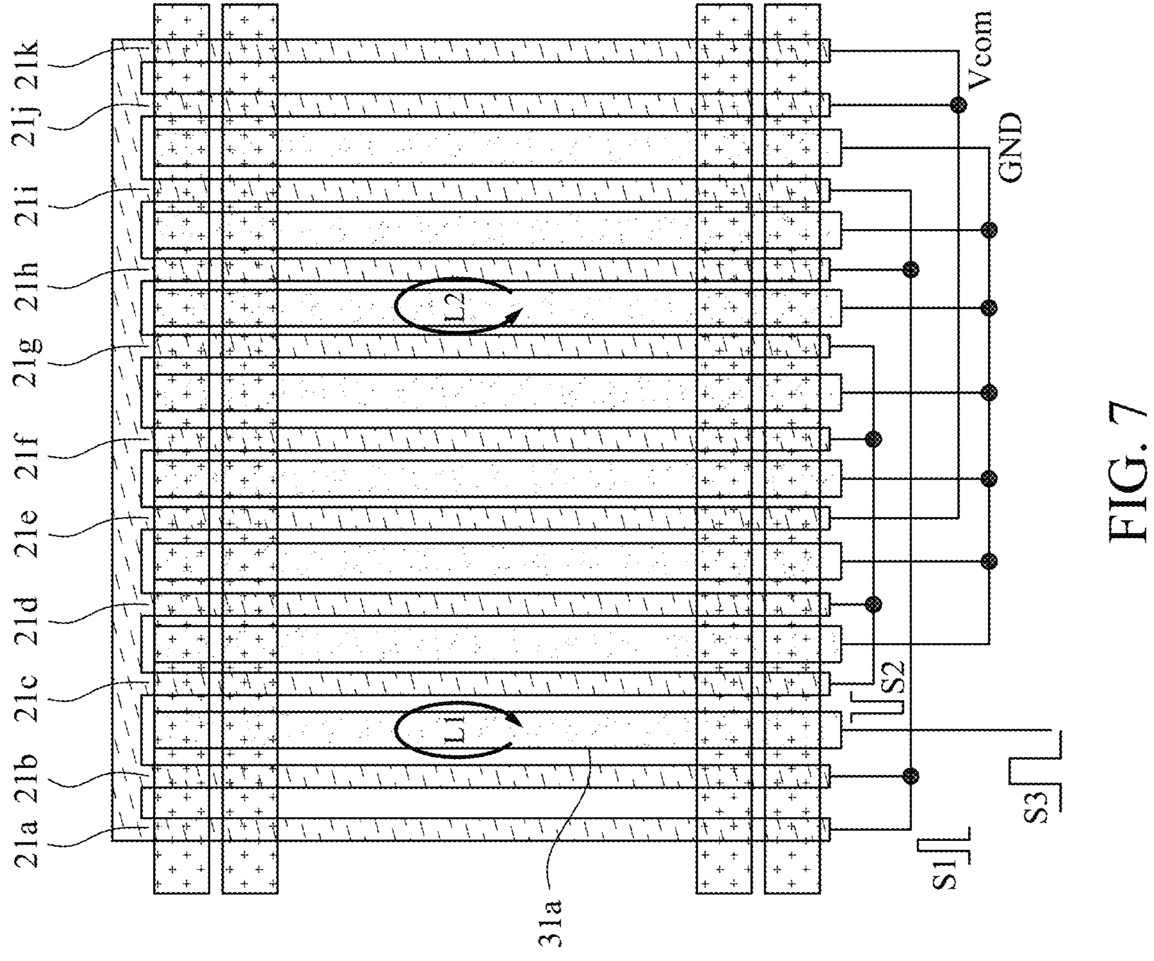
FIG. 7 and FIG. 8 are schematic diagrams of driving methods of the first sensing unit and the second sensing unit of FIG. 4 in a stylus driving mode according to some embodiments of the present disclosure.
Figure 8:
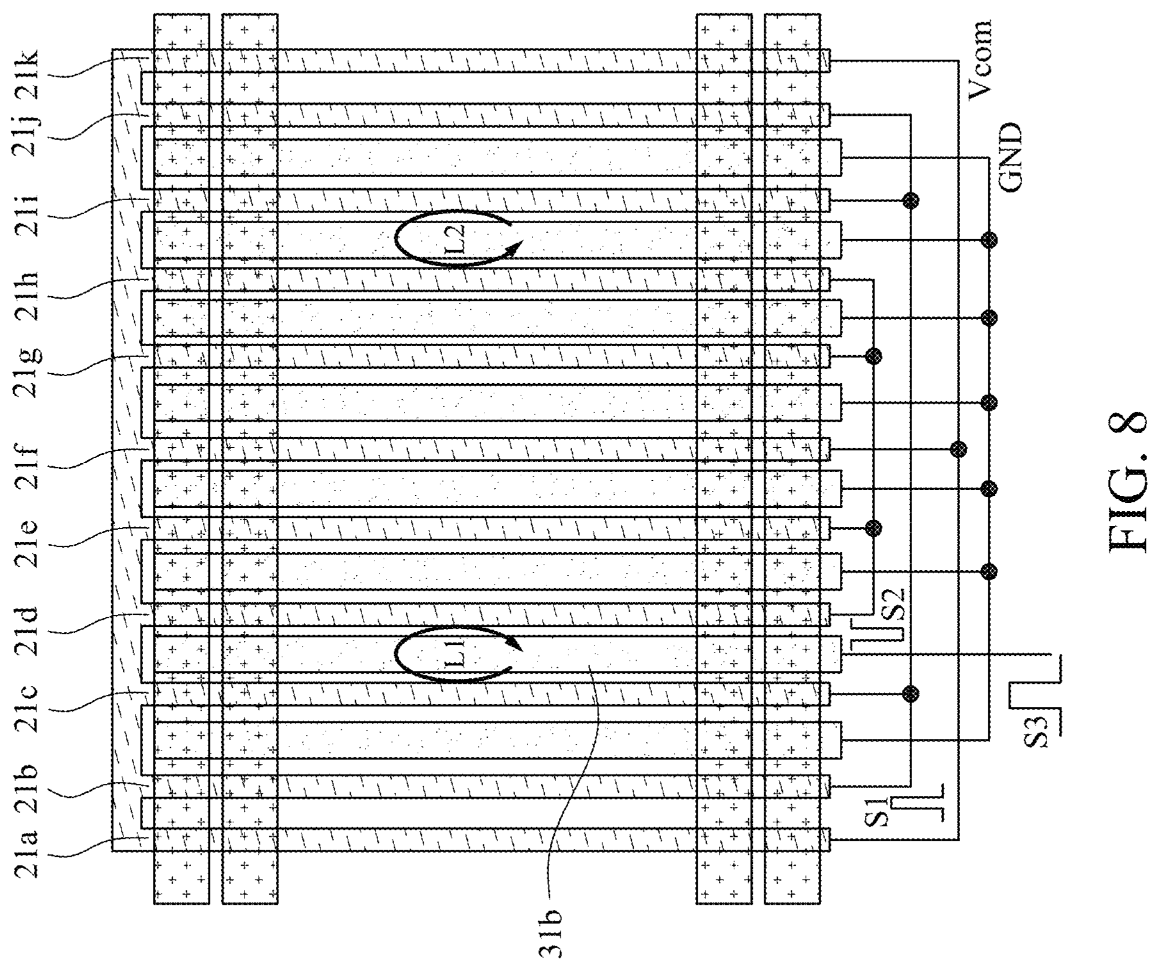
Figure 9:
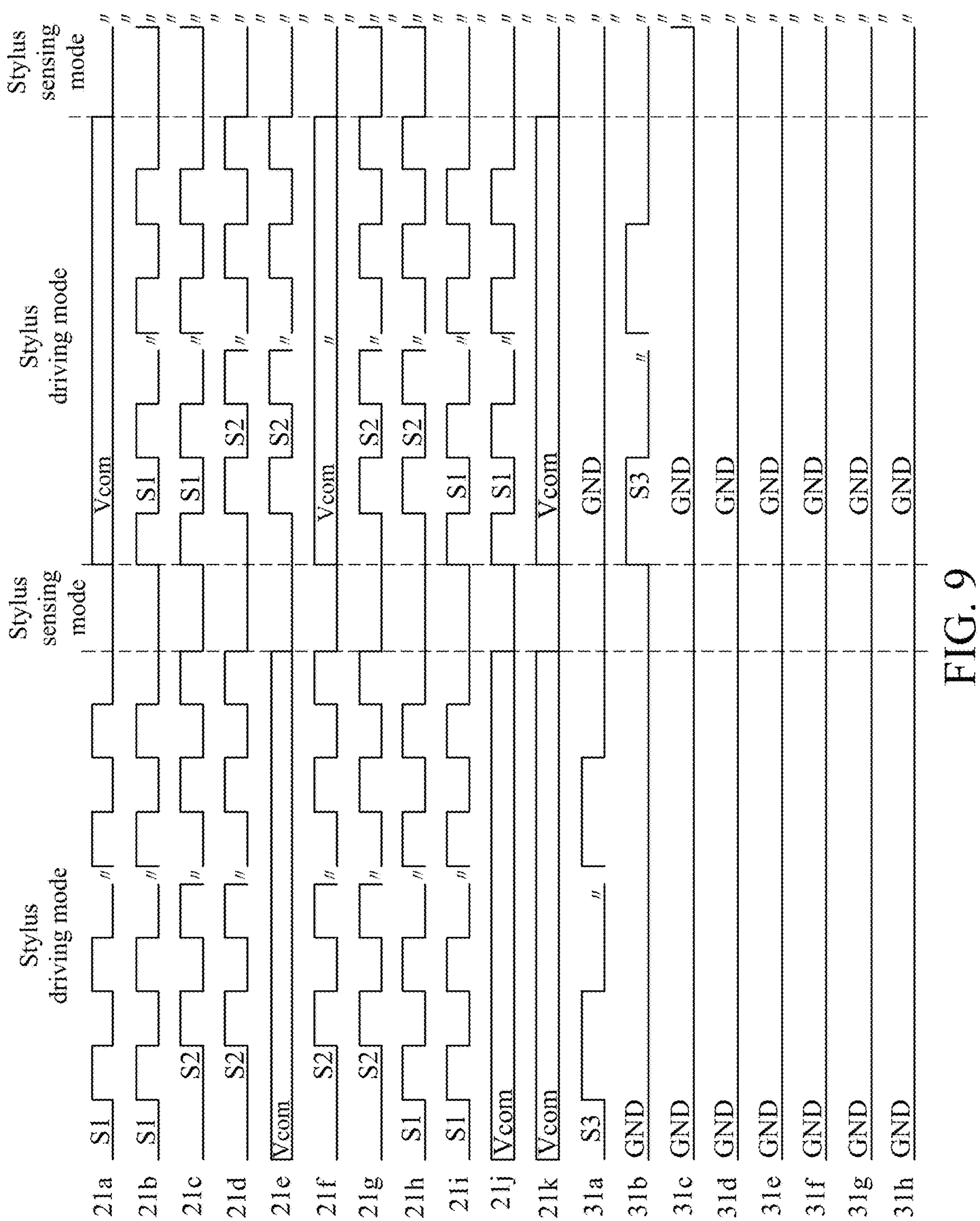
FIG. 9 is a signal timing diagram of the first sensing unit and the second sensing unit of FIG. 4 in the stylus driving mode according to some embodiments of the present disclosure.

FIG. 7 and FIG. 8 are schematic diagrams of driving methods of the first sensing unit 20 and the second sensing unit 30 of FIG. 4 in the stylus driving mode according to some embodiments of the present disclosure. FIG. 8 corresponds to the next timing sequence of FIG. 7. FIG. 9 is a signal timing diagram of the first sensing unit 20 and the second sensing unit 30 of FIG. 4 in the stylus driving mode according to some embodiments of the present disclosure. Please refer to FIG. 7, FIG. 8, and FIG. 9 for the following description.

In the stylus driving mode, a portion of the teeth of the comb-shaped electrode is driven by an AC signal, and the remaining portion of the teeth of the comb-shaped electrode receives a DC common voltage (Vcom). For example, as shown in FIG. 7, the teeth 21*a*, 21*b*, 21*h*, and 21*i* are driven by the AC signal S1, and the teeth 21*c*, 21*d*, 21*f*, and 21*g* are driven by the AC signal S2, and the teeth 21*e*, 21*j*, and 21*k* receive the DC common voltage (Vcom). For example, as shown in FIG. 8, the teeth 21*b*, 21*c*, 21*i*, and 21*j* are driven by the AC signal S1, and the teeth 21*d*, 21*e*, 21*g*, and 21*h* are driven by the AC signal S2, and the teeth 21*a*, 21*f*, and 21*k* receive the DC common voltage (Vcom). It is worth mentioning that, in other embodiments of the present disclosure, in the stylus driving mode, a portion of the teeth of the comb-shaped electrode is driven by the AC signal, and the remaining portion of the teeth of the comb-shaped electrode is floating or in a high impedance state.

In the stylus driving mode, a first subset of the teeth of the comb-shaped electrode is driven by a first AC signal, and a second subset of the teeth of the comb-shaped electrode is driven by a second AC signal, and a phase of the first AC signal is opposite to a phase of the second AC signal. In the stylus driving mode, a third subset of the teeth of the comb-shaped electrode receives the DC common voltage (Vcom), and the connecting portion 22 of the comb-shaped electrode receives the DC common voltage (Vcom). For example, as shown in FIG. 7, the teeth 21*a*, 21*b*, 21*h*, and 21*i* are driven by the AC signal S1, and the teeth 21*c*, 21*d*, 21*f*, and 21*g* are driven by the AC signal S2. As shown in FIG. 7, the phase of the AC signal S1 is opposite to the phase of the AC signal S2, and the teeth 21*e*, 21*j*, and 21*k* receive the DC common voltage (Vcom). For example, as shown in FIG. 8, the teeth 21*b*, 21*c*, 21*i*, and 21*j* are driven by the AC signal S1, and the teeth 21*d*, 21*e*, 21*g*, and 21*h* are driven by the AC signal S2. As shown in FIG. 8, the phase of the AC signal S1 is opposite to the phase of the AC signal S2, and the teeth 21*a*, 21*f*, and 21*k* receive the DC common voltage (Vcom). It is worth mentioning that, in other embodiments of the present disclosure, in the stylus driving mode, a third subset of the teeth of the comb-shaped electrode is floating or in the high impedance state.

In the stylus driving mode, the first strip-shaped electrodes are sequentially driven by a third AC signal in a time-division manner, and the frequency of the third AC signal is different from the frequency of the first AC signal, and the frequency of the third AC signal is different from the frequency of the second AC signal. For example, as shown in FIG. 7, the first strip-shaped electrode 31*a* is driven by the AC signal S3, and the rest of the first strip-shaped electrodes 31*b*~31*h* are grounded (GND). The frequency of the AC signal S3 is different from the frequency of the AC signal S1, and the frequency of the AC signal S3 is different from the frequency of the AC signal S2. In the next timing sequence of FIG. 7, that is, as shown in FIG. 8, the first strip-shaped electrode 31*b* is driven by the AC signal S3, and the rest of the first strip-shaped electrodes 31*a*, 31*c*~31*h* are grounded (GND), and so on.

In the stylus driving mode, the teeth include a first tooth, a second tooth, a third tooth, and a fourth tooth that are adjacent to each other, and the first tooth and the second tooth are adjacent to each other (but the present disclosure does not limit the first tooth and the second tooth to be adjacent to each other, and one or more teeth may be spaced between the first tooth and the second tooth) and driven by the first AC signal, and the third tooth and the fourth tooth are adjacent to each other (but the present disclosure does not limit the third tooth and the fourth tooth to be adjacent to each other, and one or more teeth may be spaced between the third tooth and the fourth tooth) and driven by the second AC signal. The first tooth, the second tooth, the third tooth, and the fourth tooth are driven to form a current loop of which current flows in a clockwise direction. For example, as shown in FIG. 7, the tooth 21*a* and the tooth 21*b* are adjacent to each other and driven by the AC signal S1, and the connecting portion 22 of the comb-shaped electrode receives the DC common voltage (Vcom). For example, as shown in FIG. 7, the tooth 21*c* and the tooth 21*d* are adjacent to each other and driven by the AC signal S2, and the teeth 21*a*, 21*b*, 21*c*, and 21*d* in FIG. 7 are driven to form a current loop L1 of which current flows in a clockwise direction. For example, as shown in FIG. 8, the tooth 21*b* and the tooth 21*c* are adjacent to each other and driven by the AC signal S1, and the connecting portion 22 of the comb-shaped electrode receives the DC common voltage (Vcom), and the tooth 21*d* and the tooth 21*e* are adjacent to each other and driven by the AC signal S2. The teeth 21*b*, 21*c*, 21*d*, and 21*e* in FIG. 8 are driven to form the current loop L1 of which current flows in the clockwise direction.

In the stylus driving mode, the teeth further include a fifth tooth, a sixth tooth, a seventh tooth, and a eighth tooth that are adjacent to each other, and the fifth tooth and the sixth tooth are adjacent to each other (but the present disclosure does not limit the fifth tooth and the sixth tooth to be adjacent to each other, and one or more teeth may be spaced between the fifth tooth and the sixth tooth) and driven by the second AC signal, and the seventh tooth and the eighth tooth are adjacent to each other (but the present disclosure does not limit the seventh tooth and the eighth tooth to be adjacent to each other, and one or more teeth may be spaced between the seventh tooth and the eighth tooth) and driven by the first AC signal. The fifth tooth, the sixth tooth, the seventh tooth, and the eighth tooth are driven to form a current loop of which current flows in a counterclockwise direction. For example, as shown in FIG. 7, the tooth 21*f* and the tooth 21*g* are adjacent to each other and driven by the AC signal S2, and the connecting portion 22 of the comb-shaped electrode receives the DC common voltage (Vcom). For example, as shown in FIG. 7, the tooth 21*h* and the tooth 21*i* are adjacent to each other and driven by the AC signal S1, and the teeth 21*f*, 21*g*, 21*h*, and 21*i* in FIG. 7 are driven to form a current loop L2 of which current flows in a counterclockwise direction. For example, as shown in FIG. 8, the tooth 21*g* and the tooth 21*h* are adjacent to each other and driven by the AC signal S2, and the connecting portion 22 of the comb-shaped electrode receives the DC common voltage (Vcom), and the tooth 21*i* and the tooth 21*j* are adjacent to each other and driven by the AC signal S1. The teeth 21*g*, 21*h*, 21*i*, and 21*j* in FIG. 8 are driven to form the current loop L2 of which current flows in the counterclockwise direction.

Figure 10:
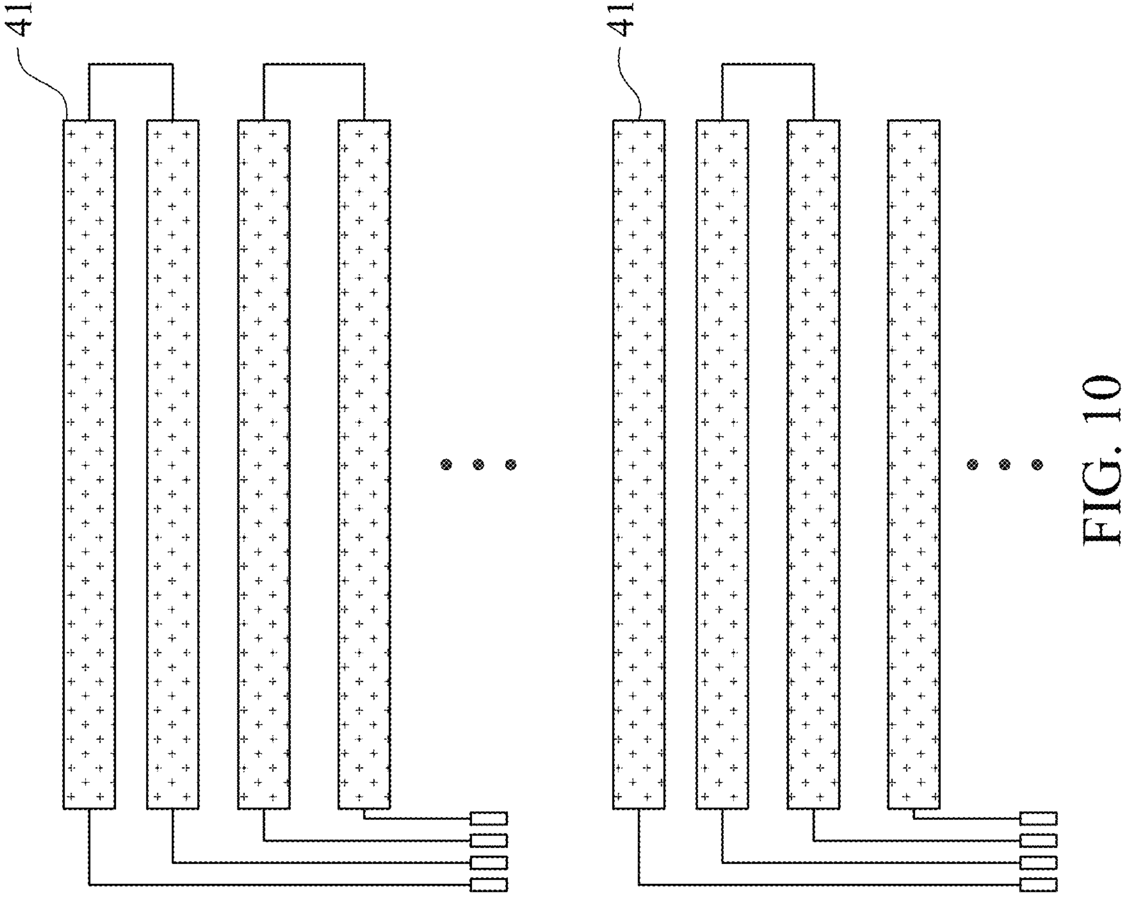
FIG. 10 is a schematic diagram showing the wiring connection of the second strip-shaped electrodes in a stylus sensing mode according to some embodiments of the present disclosure.

FIG. 10 is a schematic diagram showing the wiring connection of the second strip-shaped electrodes 41 in the stylus sensing mode according to some embodiments of the present disclosure. The lower half of FIG. 10 corresponds to the next timing sequence of the upper half of FIG. 10. As shown in FIG. 10, in the stylus sensing mode, one of the second strip-shaped electrodes 41 and the adjacent one of the second strip-shaped electrodes 41 which is adjacent to the one of the second strip-shaped electrodes 41 form a closed conductive loop. As shown in the upper half of FIG. 10, in the i-th subframe of the stylus sensing mode, one of the second strip-shaped electrodes 41 and the preceding one of the second strip-shaped electrodes 41 which is preceding and adjacent to the one of the second strip-shaped electrodes

41 forms a closed conductive loop. As shown in the lower half of FIG. 10, in the (i+1)-th subframe of the stylus sensing mode, one of the second strip-shaped electrodes 41 and the subsequent one of the second strip-shaped electrodes 41 which is subsequent to and adjacent to the one of the second strip-shaped electrodes 41 forms a closed conductive loop.

Figure 11:
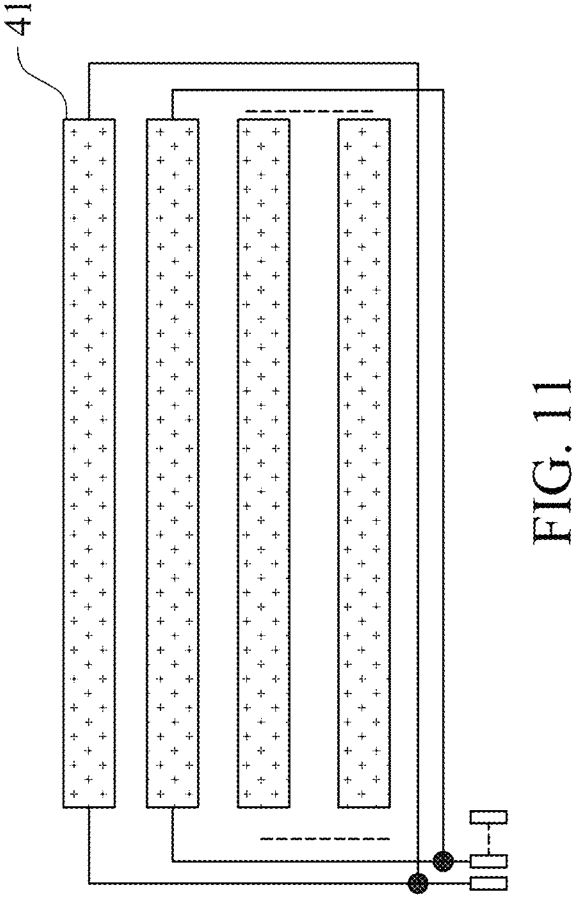
FIG. 11 is a schematic diagram showing the wiring connection of the second strip-shaped electrodes in a touch mode according to some embodiments of the present disclosure.

FIG. 11 is a schematic diagram showing the wiring connection of the second strip-shaped electrodes 41 in the touch mode according to some embodiments of the present disclosure. As shown in FIG. 11, in the touch mode, two ends of each of second strip-shaped electrode 41 are short-circuited to each other. On the other hand, in the touch mode, the teeth of the comb-shaped electrode constituting the first sensing unit 20 and the first strip-shaped electrodes 31*a*~31*h* constituting the second sensing unit 30 are driven by the same AC signal.

Figure 12:
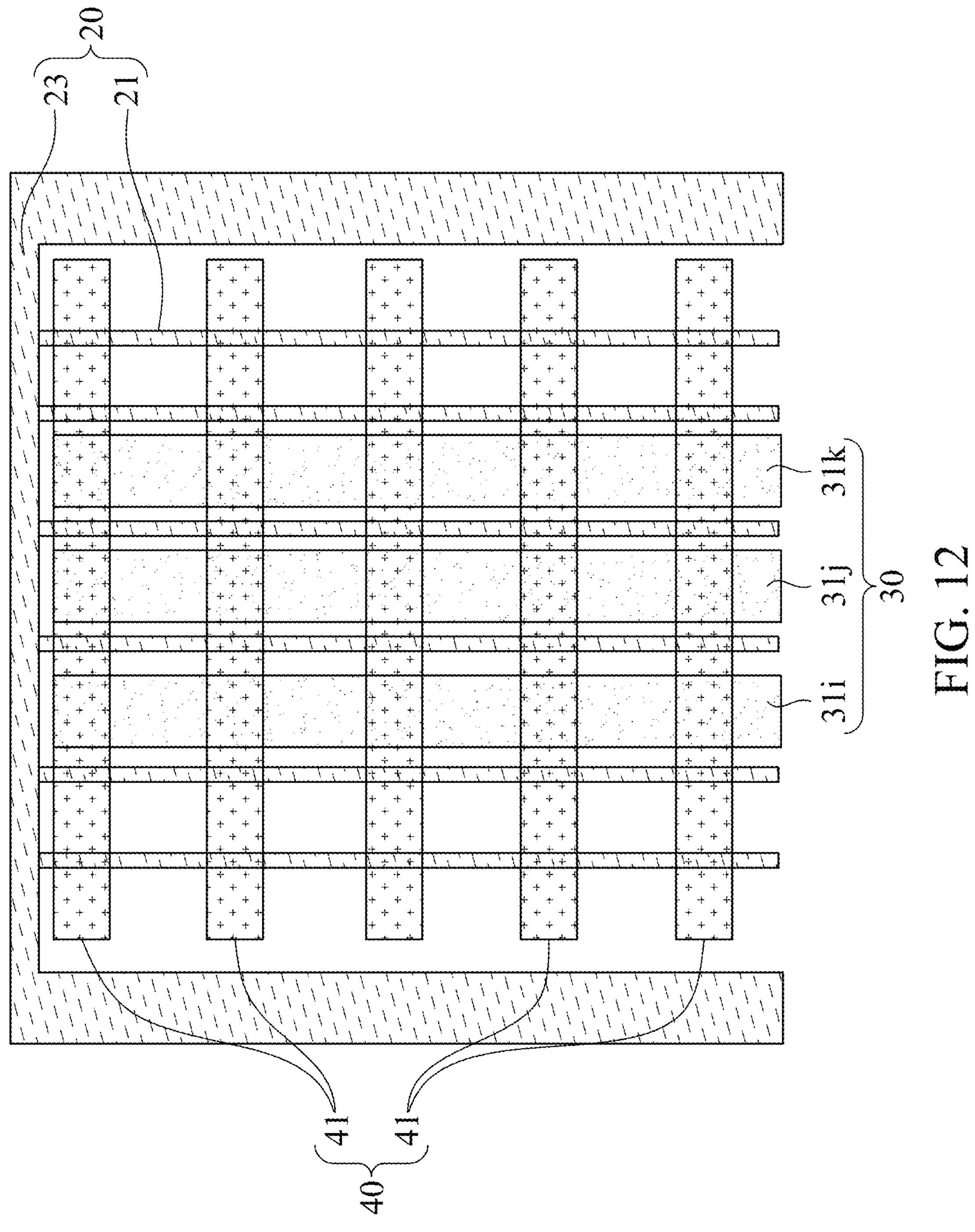
FIG. 12 is a schematic diagram of orthographic projections of the first sensing unit, the second sensing unit, and the third sensing unit on the display panel according to some other embodiments of the present disclosure.

FIG. 12 is a schematic diagram of orthographic projections of the first sensing unit 20, the second sensing unit 30, and the third sensing unit 40 on the display panel 10 according to some other embodiments of the present disclosure. FIG. 12 is similar to FIG. 4, except that a connecting portion 23 (connecting teeth of the comb-shaped electrode) included in the comb-shaped electrode of the first sensing unit 20 is shaped as an inverted U to surround the teeth 21, and the connecting portion 23 receives the DC common voltage (Vcom).

Figure 13:
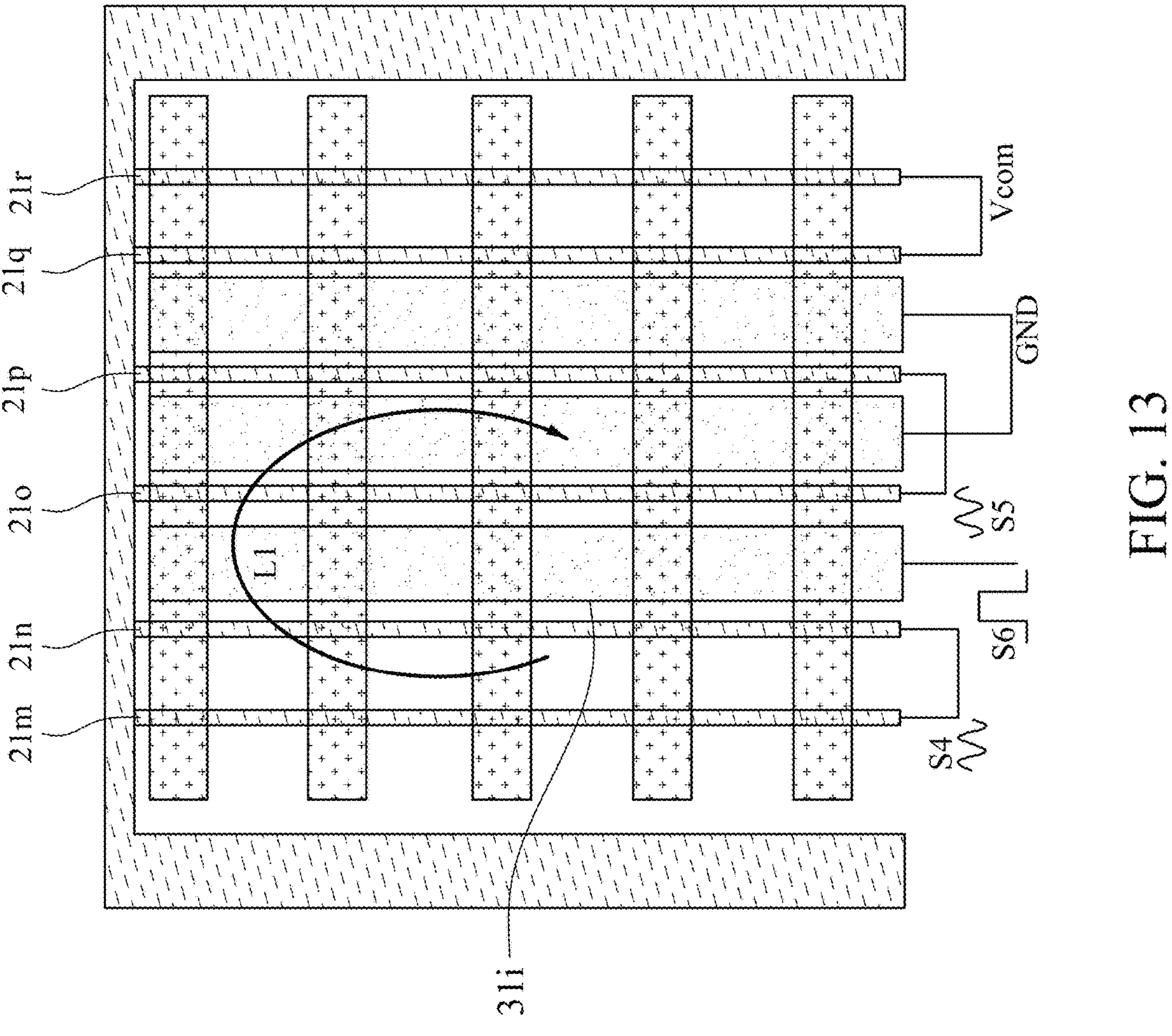
FIG. 13 and FIG. 14 are schematic diagrams of driving methods of the first sensing unit and the second sensing unit of FIG. 12 in the stylus driving mode according to some other embodiments of the present disclosure.
Figure 14:
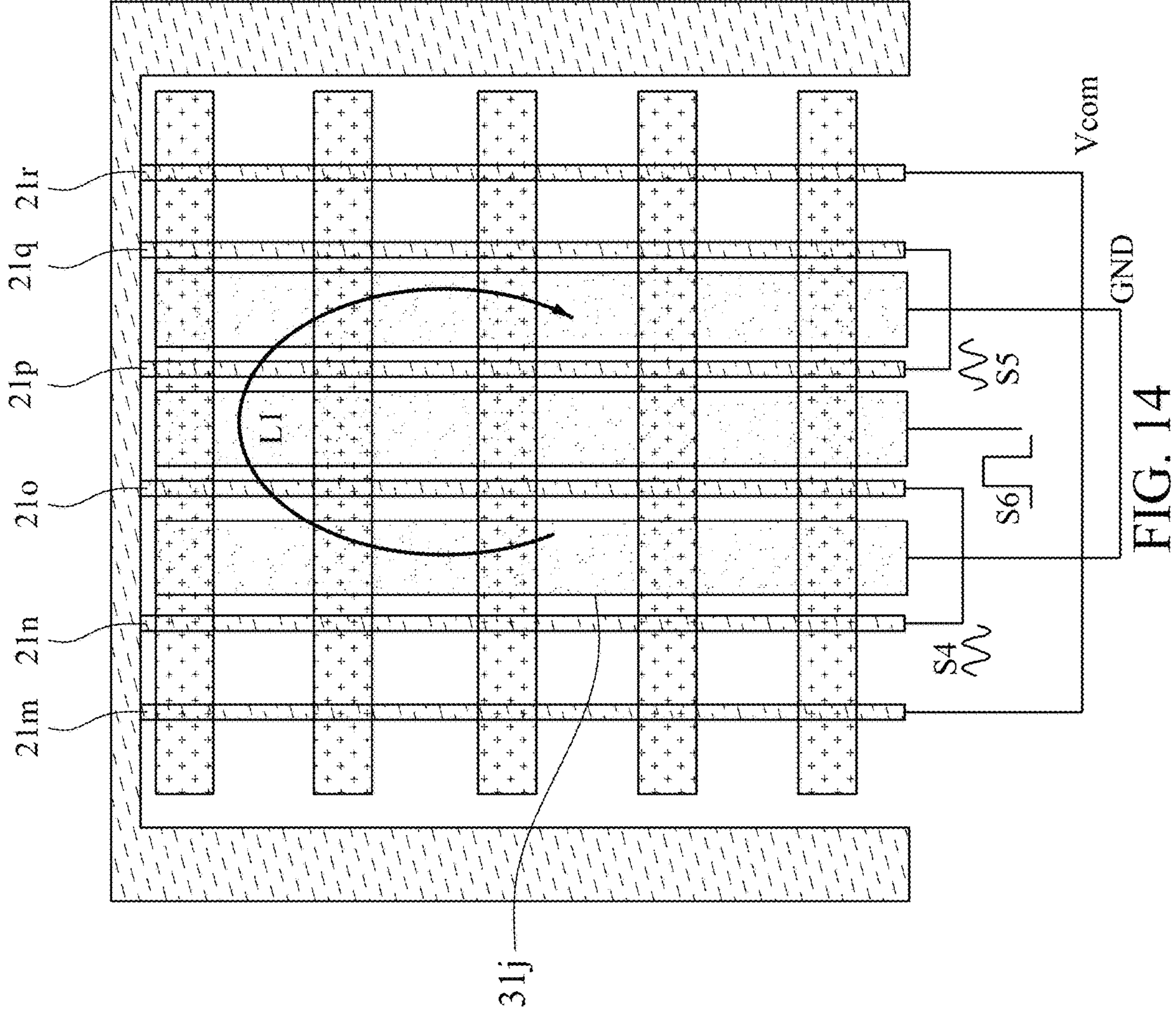
Figure 15:
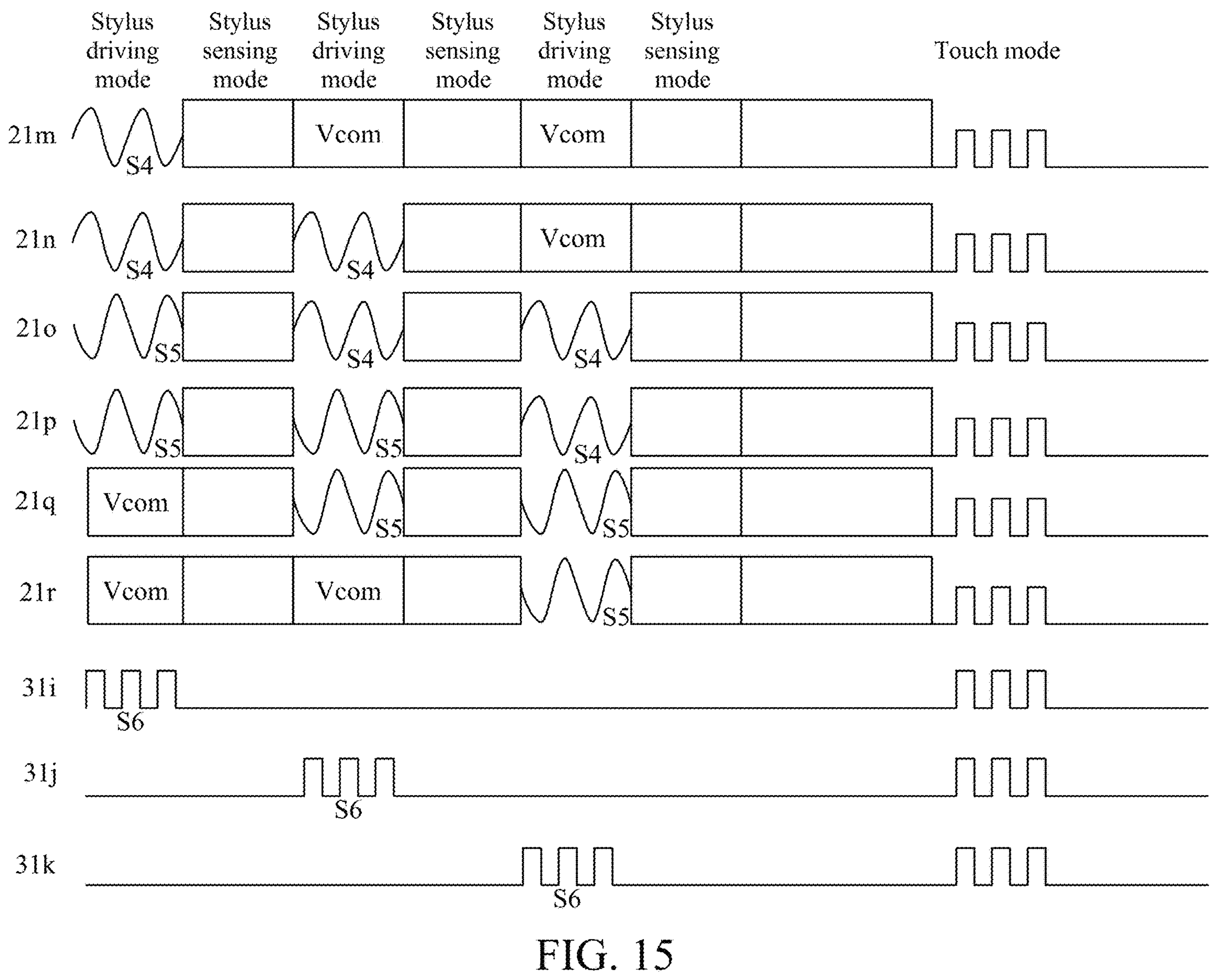
FIG. 15 is a signal timing diagram of the first sensing unit and the second sensing unit of FIG. 12 in the stylus driving mode according to some other embodiments of the present disclosure.

FIG. 13 and FIG. 14 are schematic diagrams of driving methods of the first sensing unit 20 and the second sensing unit 30 of FIG. 12 in the stylus driving mode according to some other embodiments of the present disclosure. FIG. 14 corresponds to the next timing sequence of FIG. 13. FIG. 15 is a signal timing diagram of the first sensing unit 20 and the second sensing unit 30 of FIG. 12 in the stylus driving mode according to some other embodiments of the present disclosure. Please refer to FIG. 13, FIG. 14, and FIG. 15 for the following description.

In the stylus driving mode, a portion of the teeth of the comb-shaped electrode is driven by the AC signal, and the remaining portion of the teeth of the comb-shaped electrode receives the DC common voltage (Vcom). For example, as shown in FIG. 13, the teeth 21*m* and 21*n* are driven by the AC signal S4, and the teeth 21*o* and 21*p* are driven by the AC signal S5, and the teeth 21*q* and 21*r* receive the DC common voltage (Vcom). For example, as shown in FIG. 14, the teeth 21*n* and 21*o* are driven by the AC signal S4, and the teeth 21*p* and 21*q* are driven by the AC signal S5, and the teeth 21*r* and 21*m* receive the DC common voltage (Vcom). It is worth mentioning that, in other embodiments of the present disclosure, in the stylus driving mode, a portion of the teeth of the comb-shaped electrode is driven by the AC signal, and the remaining portion of the teeth of the comb-shaped electrode is floating or in a high impedance state.

In the stylus driving mode, a first subset of the teeth of the comb-shaped electrode is driven by a first AC signal, and a second subset of the teeth of the comb-shaped electrode is driven by a second AC signal, and a phase of the first AC signal is opposite to a phase of the second AC signal. In the stylus driving mode, a third subset of the teeth of the comb-shaped electrode receives the DC common voltage (Vcom), and the connecting portion 23 of the comb-shaped electrode receives the DC common voltage (Vcom). For example, as shown in FIG. 13, the teeth 21*m* and 21*n* are driven by the AC signal S4, and the teeth 21*o* and 21*p* are driven by the AC signal S5. As shown in FIG. 13, the phase of the AC signal S4 is opposite to the phase of the AC signal S5, and the teeth 21*q* and 21*r* receive the DC common voltage (Vcom). For example, as shown in FIG. 14, the teeth 21*n* and 21*o* are driven by the AC signal S4, and the teeth 21*p* and 21*q* are driven by the AC signal S5. As shown in FIG. 14, the phase of the AC signal S4 is opposite to the phase of the AC signal S5, and the teeth 21*r* and 21*m* receive the DC common voltage (Vcom). It is worth mentioning that, in other embodiments of the present disclosure, in the stylus driving mode, a third subset of the teeth of the comb-shaped electrode is floating or in the high impedance state.

In the stylus driving mode, the first strip-shaped electrodes are sequentially driven by a third AC signal in a time-division manner, and the frequency of the third AC signal is different from the frequency of the first AC signal, and the frequency of the third AC signal is different from the frequency of the second AC signal. For example, as shown in FIG. 13, the first strip-shaped electrode 31*i* is driven by the AC signal S6, and the rest of the first strip-shaped electrodes 31*j* and 31*k* are grounded (GND). The frequency of the AC signal S6 is different from the frequency of the AC signal S4, and the frequency of the AC signal S6 is different from the frequency of the AC signal S5. In the next timing sequence of FIG. 13, that is, as shown in FIG. 14, the first strip-shaped electrode 31*j* is driven by the AC signal S6, and the rest of the first strip-shaped electrodes 31*i* and 31*k* are grounded (GND), and so on.

In the stylus driving mode, the teeth include a first tooth, a second tooth, a third tooth, and a fourth tooth that are adjacent to each other, and the first tooth and the second tooth are adjacent to each other (but the present disclosure does not limit the first tooth and the second tooth to be adjacent to each other, and one or more teeth may be spaced between the first tooth and the second tooth) and driven by the first AC signal, and the third tooth and the fourth tooth are adjacent to each other (but the present disclosure does not limit the third tooth and the fourth tooth to be adjacent to each other, and one or more teeth may be spaced between the third tooth and the fourth tooth) and driven by the second AC signal. The first tooth, the second tooth, the third tooth, and the fourth tooth are driven to form a current loop of which current flows in a clockwise direction. For example, as shown in FIG. 13, the tooth 21*m* and the tooth 21*n* are adjacent to each other and driven by the AC signal S4, and the connecting portion 23 of the comb-shaped electrode receives the DC common voltage (Vcom). For example, as shown in FIG. 13, the tooth 21*o* and the tooth 21*p* are adjacent to each other and driven by the AC signal S5, and the teeth 21*m*, 21*n*, 21*o*, and 21*p* in FIG. 13 are driven to form a current loop L1 of which current flows in a clockwise direction. For example, as shown in FIG. 14, the tooth 21*n* and the tooth 21*o* are adjacent to each other and driven by the AC signal S4, and the connecting portion 23 of the comb-shaped electrode receives the DC common voltage (Vcom), and the tooth 21*p* and the tooth 21*q* are adjacent to each other and driven by the AC signal S5. The teeth 21*n*, 21*o*, 21*p*, and 21*q* in FIG. 14 are driven to form the current loop L1 of which current flows in the clockwise direction.

In addition, as shown in FIG. 15, in the touch mode, the teeth 21*m*~21*r* of the comb-shaped electrode constituting the first sensing unit 20 and the first strip-shaped electrodes 31*i*~31*k* constituting the second sensing unit 30 are driven by the same AC signal.

To sum up, the present disclosure provides a touch sensing structure, and the touch sensing structure only needs to arrange three metal layers (i.e., the first sensing unit 20, the second sensing unit 30, and the third sensing unit 40) to integrate the passive electromagnetic stylus sensing function and the finger touch sensing function on the display panel 10, which is advantageous in achieving lightweight products and reducing process complexity.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. A touch sensing structure, comprising:

a display panel;

a first sensing unit disposed on a first side or a second side of the display panel;

a second sensing unit disposed on the second side of the display panel; and a third sensing unit disposed on the second side of the display panel;

wherein in response to the first sensing unit being disposed on the second side of the display panel, the first sensing unit and the second sensing unit belong to a same layer;

wherein each of the first sensing unit and second sensing unit is composed of a plurality of first metal grid units;

wherein each of the first metal grid units is shaped as a rhombus and an acute angle of the rhombus is less than 90 degrees;

wherein the first sensing unit is a comb-shaped electrode comprising a plurality of teeth and a connecting portion connecting the teeth, the second sensing unit is composed of a plurality of first strip-shaped electrodes, and one of the first strip-shaped electrodes is disposed between adjacent two of the plurality of teeth of the comb-shaped electrode; and wherein in a stylus driving mode, a first subset of the teeth of the comb-shaped electrode is driven by a first AC signal, and a second subset of the teeth of the comb-shaped electrode is driven by a second AC signal, wherein a phase of the first AC signal is opposite to a phase of the second AC signal.

2. The touch sensing structure of claim 1, wherein the acute angle of the rhombus is oriented toward or away from a propagation direction of light emitted by the display panel.

3. The touch sensing structure of claim 1, wherein an orthographic projection of the first sensing unit on the display panel is not overlapped with an orthographic projection of the second sensing unit on the display panel.

4. The touch sensing structure of claim 1, wherein in the stylus driving mode, a third subset of the teeth of the comb-shaped electrode and the connecting portion of the comb-shaped electrode receive a DC common voltage.

5. The touch sensing structure of claim 1, wherein in the stylus driving mode, a third subset of the teeth of the comb-shaped electrode is floating or in a high impedance state.

6. The touch sensing structure of claim 1, wherein in the stylus driving mode, the first strip-shaped electrodes are sequentially driven by a third AC signal in a time-division manner, and a frequency of the third AC signal is different from a frequency of the first AC signal, and the frequency of the third AC signal is different from a frequency of the second AC signal.

7. The touch sensing structure of claim 1, wherein the third sensing unit is composed of a plurality of second metal grid units, and each of the second metal grid units is shaped as a rhombus.

8. The touch sensing structure of claim 7, wherein an orthographic projection of the first metal grid units on the display panel is perpendicular to an orthographic projection of the second metal grid units on the display panel.

9. The touch sensing structure of claim 1, wherein the teeth comprise a first tooth, a second tooth, a third tooth, and a fourth tooth adjacent to each other, wherein the first tooth and the second tooth are adjacent to each other and driven by the first AC signal, wherein the third tooth and the fourth tooth are adjacent to each other and driven by the second AC signal.

10. The touch sensing structure of claim 9, wherein the teeth further comprise a fifth tooth, a sixth tooth, a seventh tooth, and an eighth tooth adjacent to each other, wherein the fifth tooth and the sixth tooth are adjacent to each other and driven by the second AC signal, wherein the seventh tooth and the eighth tooth are adjacent to each other and driven by the first AC signal, wherein the first tooth, the second tooth, the third tooth, and the fourth tooth are driven to form a current loop of which current flows in a clockwise direction, wherein the fifth tooth, the sixth tooth, the seventh tooth, and the eighth tooth are driven to form a current loop of which current flows in a counterclockwise direction.

11. The touch sensing structure of claim 1, further comprising:

a transparent substrate located between the second sensing unit and the third sensing unit.

12. A touch sensing structure, comprising:

a display panel;

a first sensing unit disposed on a first side or a second side of the display panel;

a second sensing unit disposed on the second side of the display panel; and a third sensing unit disposed on the second side of the display panel;

wherein in response to the first sensing unit being disposed on the second side of the display panel, the first sensing unit and the second sensing unit belong to a same layer;

wherein each of the first sensing unit and second sensing unit is composed of a plurality of first metal grid units;

wherein each of the first metal grid units is shaped as a rhombus and an acute angle of the rhombus is less than 90 degrees;

wherein the first sensing unit is a comb-shaped electrode comprising a plurality of teeth and a connecting portion connecting the teeth, the second sensing unit is composed of a plurality of first strip-shaped electrodes, and one of the first strip-shaped electrodes is disposed between adjacent two of the plurality of teeth of the comb-shaped electrode; and wherein in a stylus driving mode, a portion of the teeth of the comb-shaped electrode is driven by an AC signal, and a remaining portion of the teeth of the comb-shaped electrode receives a DC common voltage.

13. The touch sensing structure of claim 12, wherein in a touch mode, the teeth of the comb-shaped electrode and the first strip-shaped electrodes are driven by a same AC signal.

14. The touch sensing structure of claim 13, wherein the third sensing unit is composed of a plurality of second strip-shaped electrodes, and an orthographic projection of the first strip-shaped electrodes on the display panel is perpendicular to an orthographic projection of the second strip-shaped electrodes on the display panel.

15. The touch sensing structure of claim 14, wherein in a stylus sensing mode, one of the second strip-shaped electrodes and an adjacent one of the second strip-shaped electrodes which is adjacent to the one of the second strip-shaped electrodes form a closed conductive loop.

16. The touch sensing structure of claim 15, wherein in an i-th subframe of the stylus sensing mode, the one of the second strip-shaped electrodes and a preceding one of the second strip-shaped electrodes which is preceding and adjacent to the one of the second strip-shaped electrodes form a closed conductive loop, wherein in an (i+1)-th subframe of the stylus sensing mode, the one of the second strip-shaped electrodes and a subsequent one of the second strip-shaped electrodes which is subsequent to and adjacent to the one of the second strip-shaped electrodes form a closed conductive loop.

17. The touch sensing structure of claim 14, wherein in the touch mode, two ends of each of the second strip-shaped electrodes are short-circuited to each other.

18. The touch sensing structure of claim 12, wherein the first sensing unit is used as a signal transmitting terminal in the stylus driving mode, and the third sensing unit is used as a signal receiving terminal in a stylus receiving mode.

19. The touch sensing structure of claim 13, wherein one of the second sensing unit and the third sensing unit is used as a signal transmitting terminal in the touch mode, and the other of the second sensing unit and the third sensing unit is used as a signal receiving terminal in the touch mode.

* * * * *